United States Patent Office 2,890,118
Patented June 9, 1959

2,890,118

QUICK-COOKING CEREAL PRODUCT AND PROCESS OF PRODUCING SAME

Sidney M. Cantor, Overbrook Hills, Pa., and Lucille Faller and Bernard Wolnak, Chicago, Ill., assignors to John S. Campbell, Minneapolis, Minn.

No Drawing. Application November 13, 1956
Serial No. 621,551

12 Claims. (Cl. 99—83)

The present invention relates generally to foodstuffs and more particularly to so-called quick-cooking farina type cereals which require reduced cooking time.

Conventional farina requires cooking, for an appreciable time, in a fairly large amount of water, with the need for constant agitation to prevent scorching and lumping; cooking time being even greater when a double-boiler is used to prevent overheating. The time and care thus required has resulted in the development of so-called pre-cooked cereals, which are pretreated, by steaming, passing over heated rolls or exploding in a moist heated atmosphere or in a vacuum, to achieve a degree of gelatinization, hydration and/or denaturation comparable to that attained in the conventional cooking operation, so that these pre-cooked cereals can be mixed with cold water or milk and eaten without any heating. However, these pre-treating operations give the so-called cold or instant cereals markedly different mouth feel, flavor, consistency and other organoleptic properties from those normally associated with conventional "hot" cereals requiring extended cooking, as mentioned above.

Thus, instant cereals (i.e., those which can be mixed with cold milk and served without any heating) as well as quick-cooking cereals (i.e., those which still need cooking but for a shorter time than otherwise needed) have heretofore derived their popularity solely from convenience of preparation and despite the fact that their flavor, mouth feel, consistency, etc. have been altered considerably from the characteristics, long considered desirable, of ordinary untreated long-cooking "hot" cereals.

The industry has, for a long time, tried unsuccessfully to develop a farina type cereal product which would be quick-cooking (i.e., requiring only a fraction of the normal cooking time) and which, at the same time, would retain the desirable flavor, mouth feel, consistency and other organoleptic properties of ordinary untreated slow-cooking farina.

Accordingly, it is an object of the present invention to provide a new and useful farina type cereal, as well as a method of producing the same, which will "cook" in a fraction of the time ordinarily required, which requires an appreciably smaller proportion of water or milk during cooking, which has reduced tendency to lump or cake in the cooking utensil, and which is substantially unchanged from ordinary slow-cooking farina cereal in mouth feel, flavor, consistency and other organoleptic properties, as well as in physical appearance. Other objects and advantages of the present invention are apparent in the following detailed description and appended claims.

According to the present invention, it is possible to obtain a farina type cereal product which will "cook" in a half-minute or even less, which requires one-third to one-half less water during cooking, which has markedly reduced tendency to lump or cake in the cooking utensil, and which, when prepared, is substantially unchanged from ordinary slow-cooking farina in physical appearance, as well as in mouth feel, flavor, texture, consistency, and other organoleptic properties.

Generally speaking, these desirable results are achieved by incorporating into the conventional farina type cereal a small proportion of a gum and/or thickening agent which, it is believed, acts to reduce heating time needed in preparing the cereal for consumption by more effectively suspending the farina particles throughout the hot water and increasing the total surface available for water adsorption and/or absorption so that the hydration, gelatinization and/or denaturation takes place in substantially less time, and with appreciably less water needed, than is the case with ordinary farina. Among the gums which have been found particularly effective in producing such a desirable quick cooking farina type cereal are gum tragacanth, gum karaya, gum arabic and purified gum guar. Somewhat less effective but still capable of appreciably reducing farina cooking time are such thickening agents as agar and refined algin. The gum or thickening agent, or mixtures thereof, is added in small amount, usually about ½ to 2½% of the total mixture by weight, and more preferably about ½ to 1% of the mixture by weight.

The gum or thickening additive is preferably incorporated into the dry-milled farina after other desirable additives, such as vitamin and iron components, malt, wheat germ, etc., have been mixed therewith. The normal water content (about 13–14%) of the farina, plus the agitation which goes on during the addition of the gum or thickening additive, results in the gum or thickening additive being smoothly dispersed throughout the mixture. Thereafter, the mixture is sterilized in conventional manner (for example by using a conventional revolving drum drier); the heating time and temperature being adjusted to give the final product a moisture content of about 10%. Nutritive and flavoring additives, such as vitamin and iron components, malt, wheat germ and the like, have no appreciable effect upon the quick-cooking action of the gum or thickening additive. The gum or thickening additive, in the concentrations used, has no appreciable effect upon the mouth feel, flavor, texture, consistency and other organoleptic properties of the final quick-cooked product as compared to ordinary slow-cooked farina without the gum or thickening additive.

The farina type cereal of the present invention may be prepared for consumption in the following manner.

2 cups of water (about 475 ml.) containing a small amount (about ½ teaspoon) of salt, is brought to a full boil in a sauce pan or the like and to it is added, slowly and with stirring, about 100 grams of the cereal mixture. The contents of the sauce pan are then brought back to a boil, removed from the source of heat, and stirred for about 30 seconds, whereupon it is ready for serving. However, instead of having the cereal served immediately after the 30 second stirring period, it is possible to permit it to stand, in a covered pan, for an additional period of time up to about 5 minutes, without the need for further stirring, thereby to effect even more thorough cooking and further improved organoleptic properties.

By way of contrast, conventional farina of the same type (that is, produced from the same grain, in the same manner, and with the same fortifying and flavor-producing ingredients, but without the gum or thickening additive) requires considerable longer cooking time and substantially more water, as shown by the following example. 3 cups of water (about 713 ml.) containing about ¾ teaspoon of salt is brought to a full boil and to it is added, with vigorous stirring and at a rate sufficiently slow that boiling does not stop, about 100 grams of the farina. Cooking is continued, over low heat, for at least 3 minutes, with continued vigorous stirring before the cereal is ready to serve. Where a double boiler is employed, 7 minutes of cooking, with continued stirring, is required.

The standing period of up to about 5 minutes is especially desirable where the comparatively less effective thickening additives (i.e., agar, refined algin) are used and this waiting period becomes less necessary with gums such as gum tragacanth, gum karaya, gum arabic and purified gum guar.

It can be seen that the use of the novel quick-cooking farina type cereal of this invention provides marked advantages over the use of conventional slow-cooking farina.

Thus, there is the marked reduction in cooking and stirring time needed. The housewife, if she is pressed for time, need only bring the salted water to a boil, add the cereal with stirring, bring the mixture back to a boil, stir for a few seconds and serve. Or, if she wishes to have more thorough cooking, she can do other things while the cereal stands unattended for a few minutes in a covered pan. There is no danger of scorching or lumping as occurs when ordinary farina is slow-cooked without adequate attention or stirring.

Then, there is the substantial reduction in the quantity of water required for cooking a given weight of cereal. As pointed out above, 100 grams of our novel quick-cooking farina requires only 2 cups of water for cooking, while conventional slow-cooking farina requires 3 cups of water for the same amount of farina. Indeed, we have discovered that as little as 1½ cups of water can be used satisfactorily to cook 100 grams of our cereal, so that there is a reduction of one-third to one-half in the amount of water needed, as compared to that required for conventional slow-cooking farina. This reduction in water needed is important especially for people who prefer the taste and mouth feel of a thick cereal, or those who like to add large quantities of milk or cream after cooking. Additionally, of course, 1½ cups of water can be brought to a boil in half the time needed for 3 cups, so that a further reduction in overall preparation time is effected, as compared to conventional slow-cooking farina.

Of course, it is possible to use milk instead of water in cooking our novel farina type cereal, as preferred by some people, and in such case the marked reduction in cooking time provides another advantage since, as is well known, the longer milk is cooked the greater the change in its taste and the greater the risk of scorching.

The following are illustrative examples of our novel quick-cooking farina type cereal and its method of production.

*Example 1*

A farina type cereal, which has been made from wheat by conventional dry milling operations and into which has been incorporated a minor proportion of suitable nutritive and flavoring ingredients, as for example vitamins, iron-containing compounds, malt, etc. and which has a moisture content of about 13–14% by weight, is agitated and to it is added gum tragacanth, in amount sufficient to constitute about 1% by weight of the total mixture; the agitation being continued until there is uniform dispersion. The mixture is then sterilized in conventional manner (for example by passing it through a conventional rotating drum drier); the heating time and temperature being so controlled during sterilization that about 3–4% of the moisture is removed, leaving the final product with a moisture content of about 10%, whereupon it is ready for packaging. In use, about 100 grams of the cereal is added, slowly and with stirring, to 2 cups (about 475 ml.) of water containing about ½ teaspoon of salt, which has first been brought to a full boil. After the cereal has been added, the mixture is again brought to a full boil, with stirring, then removed from the source of heat and stirred for about 30 seconds. The cereal is then ready for immediate serving, although optionally it can be allowed to stand in a covered pan without stirring for up to about 5 minutes to achieve somewhat greater cooking action. Milk or cream, sugar and/or butter may be added according to the tastes of individual users.

The product is fully comparable to ordinary slow-cooked farina in appearance, flavor, consistency, mouth feel, and other organoleptic properties. There is a marked reduction in tendency to scorch, lump and adhere to the sauce pan, as well as a substantial reduction in cooking time and water required.

Satisfactory results are also obtained when the foregoing procedure is repeated with varying proportions of gum tragacanth ranging from about ½% to about 2½%; and likewise when the cooking procedure is repeated with varying amounts of salted water ranging from about 1½ cups to about 2½ cups.

*Example 2*

The procedures of Example 1 are repeated but substituting gum karaya for gum tragacanth. The results are in all respects comparable and satisfactory.

*Example 3*

The procedures of Example 1 are repeated but substituting gum arabic for gum tragacanth. The results are in all respects comparable and satisfactory.

*Example 4*

The procedures of Example 1 are repeated but substituting purified gum guar for gum tragacanth. The results are in all respects comparable and satisfactory.

*Example 5*

The procedures of Example 1 are repeated but substituting agar for gum tragacanth. The results were satisfactory although the standing period of up to about 5 minutes was usually found to be more essential for best results.

*Example 6*

The procedures of Example 1 are repeated but substituting refined algin for gum tragacanth. The results are satisfactory although the standing period of up to about 5 minutes is usually found to be more essential for best results.

The present invention may be embodied in other specific forms without departing from the spirit or essential attributes thereof and accordingly the foregoing embodiments are to be considered in all respects merely as illustrative and not restrictive; reference being made to the appended claims as indicating the scope of this invention.

Having thus described our invention, we claim as new and desire to protect by Letters Patent the following:

1. A quick-cooking cereal product comprising a major proportion of wheat farina having a moisture content of below about fourteen percent by weight, and about one-half to two and one-half percent by weight of a thickening and suspending agent comprising at least one member of the group consisting of gum tragacanth, gum karaya, gum arabic, purified gum guar, agar, and refined algin.

2. A cereal product in accordance with claim 1 wherein the thickening and suspending agent consists of gum tragacanth.

3. A cereal product in accordance with claim 1 in which the thickening and suspending agent consists of gum karaya.

4. A cereal product in accordance with claim 1 in which the thickening and suspending agent consists of purified gum guar.

5. A cereal product in accordance with claim 1 in which the thickening and suspending agent consists of agar.

6. A cereal product in accordance with claim 1 in which the thickening and suspending agent consists of refined algin.

7. A method of forming a quick-cooking cereal product comprising the steps of forming a dry-milled wheat farina and which has a moisture content of below about fourteen percent by weight, and adding to said farina with agitation about one-half to two and a half percent by weight of a thickening and suspending agent comprising at least one member of the group consisting of gum tragacanth, gum karaya, gum arabic, purified gum guar, agar, and refined algin, and heating the resultant mixture until the same is sterile.

8. A method in accordance with claim 7 in which the thickening and suspending agent consists of gum tragacanth.

9. A method in accordance with claim 7 in which the thickening and suspending agent consists of gum karaya.

10. A method in accordance with claim 7 in which the thickening and suspending agent consists of purified gum guar.

11. A method in accordance with claim 7 in which the thickening and suspending agent consists of agar.

12. A method in accordance with claim 7 in which the thickening and suspending agent consists of refined algin.

References Cited in the file of this patent

UNITED STATES PATENTS

| | | |
|---|---|---|
| 2,278,465 | Musher | Apr. 7, 1942 |

FOREIGN PATENTS

| | | |
|---|---|---|
| 5,356 | Great Britain | Mar. 22, 1890 of 1889 |
| 100,609 | Great Britain | June 15, 1916 |
| 385,200 | Great Britain | Dec. 22, 1932 |

OTHER REFERENCES

"The Encyclopedia of Food," 1923, published by Artemas Ward (N.Y.) page 190 relied on.